(12) United States Patent
Soatti et al.

(10) Patent No.: US 11,897,569 B2
(45) Date of Patent: Feb. 13, 2024

(54) SADDLE-RIDING VEHICLE PROVIDED WITH A FRAME HAVING REDUCED STIFFNESS AGAINST YAW MOVEMENTS

(71) Applicant: PIAGGIO & C. S.P.A., Pontedera (IT)

(72) Inventors: Piero Soatti, Pontedera (IT); Damiano Bellan, Pontedera (IT); Massimiliano Piccioli, Pontedera (IT)

(73) Assignee: Piaggio & C. S.p.A., Pontedera (IT)

( * ) Notice: Subject to any disclaimer, the term of this patent is extended or adjusted under 35 U.S.C. 154(b) by 8 days.

(21) Appl. No.: 17/912,640

(22) PCT Filed: Mar. 15, 2021

(86) PCT No.: PCT/IB2021/052126
§ 371 (c)(1),
(2) Date: Sep. 19, 2022

(87) PCT Pub. No.: WO2021/186321
PCT Pub. Date: Sep. 23, 2021

(65) Prior Publication Data
US 2023/0242206 A1    Aug. 3, 2023

(30) Foreign Application Priority Data

Mar. 19, 2020 (IT) .......................... 102020000005860

(51) Int. Cl.
*B62K 11/04* (2006.01)
*B62K 21/02* (2006.01)
*B62K 25/28* (2006.01)

(52) U.S. Cl.
CPC .............. *B62K 11/04* (2013.01); *B62K 21/02* (2013.01); *B62K 25/28* (2013.01)

(58) Field of Classification Search
CPC ........ B62K 11/04; B62K 21/02; B62K 25/28; B62K 19/10; B62K 25/286
See application file for complete search history.

(56) References Cited

U.S. PATENT DOCUMENTS

| 4,727,953 A | 3/1988 | Kudo et al. |
|---|---|---|
| 2006/0169511 A1 | 8/2006 | Kurokawa |

(Continued)

FOREIGN PATENT DOCUMENTS

DE    19601573 A1    8/1996

OTHER PUBLICATIONS

International Search Authority: European Patent Office International Search Report for PCT/IB2021/052126 dated Jun. 23, 2021, 7 pages.

*Primary Examiner* — Paul N Dickson
*Assistant Examiner* — Shams Dhanani
(74) *Attorney, Agent, or Firm* — Patterson Intellectual Property Law, P.C.

(57) ABSTRACT

The present invention relates to a saddle-riding vehicle, preferably an endurance-type vehicle. The vehicle comprises a steering tube to which a steering assembly that controls a front wheel is rotatingly connected. The vehicle comprises a frame comprising a central part (12) to which is hinged a first end (8A) of a fork (8) which also comprises a second end (8B) rotatingly connected to a rear wheel (4). This frame also comprises a front part (15) extending between the steering tube (11) and said central part (12), wherein this front part (15) comprises a first frame side (15A) and a second frame side (15B) separated in the direction of the width of the vehicle and made of a first metallic material. The vehicle according to the invention is characterised in that it comprises at least a pair of connecting plates (16A-16B) wherein a first plate (16A) connects said engine assembly (2) to said first frame side (15A) and a second plate (16B) that connects said engine assembly (2) to said second frame side (15B). These plates (16A-16B) are made of a second metallic material having a modulus of elasticity lower than that of said first material constituting (Continued)

said frame sides (15A,15B) of said front part (15) of the frame (10).

15 Claims, 7 Drawing Sheets

(56) References Cited

U.S. PATENT DOCUMENTS

| | | | |
|---|---|---|---|
| 2009/0322069 A1* | 12/2009 | Koike | F02M 35/10052 |
| | | | 280/835 |
| 2015/0000992 A1* | 1/2015 | Hagimoto | B62K 11/04 |
| | | | 180/219 |
| 2016/0107714 A1* | 4/2016 | Ishida | B62K 11/04 |
| | | | 180/228 |
| 2018/0257726 A1* | 9/2018 | Bagnariol | B62K 11/00 |
| 2019/0047654 A1* | 2/2019 | Hasegawa | B62K 19/06 |
| 2020/0102034 A1* | 4/2020 | Mayuzumi | B62J 25/00 |
| 2020/0102035 A1* | 4/2020 | Mayuzumi | B62K 11/04 |
| 2020/0102041 A1* | 4/2020 | Pelz | F02M 35/10144 |
| 2020/0172196 A1* | 6/2020 | Futamata | B62K 25/04 |
| 2020/0204043 A1* | 6/2020 | Matsushima | H02K 5/203 |
| 2020/0391819 A1* | 12/2020 | Matsuo | B62K 19/28 |
| 2020/0398924 A1* | 12/2020 | Kuroba | B62J 45/42 |
| 2020/0407005 A1* | 12/2020 | Shirasuna | B62M 7/02 |
| 2021/0001953 A1* | 1/2021 | Shirasuna | B62J 45/00 |
| 2021/0078663 A1* | 3/2021 | Abe | F02M 35/162 |
| 2021/0107585 A1* | 4/2021 | Maeda | B62K 19/24 |
| 2021/0354774 A1* | 11/2021 | Kugele | B62J 1/08 |
| 2023/0064856 A1* | 3/2023 | Yamamoto | B62J 41/00 |
| 2023/0108243 A1* | 4/2023 | Mori | B62J 1/08 |
| | | | 280/152.1 |
| 2023/0123389 A1* | 4/2023 | Langlois | B62J 50/26 |
| | | | 180/219 |
| 2023/0303210 A1* | 9/2023 | Miyashiro | B62K 11/04 |
| | | | 180/219 |
| 2023/0312049 A1* | 10/2023 | Jorgensen | B62K 25/30 |
| | | | 280/284 |
| 2023/0339564 A1* | 10/2023 | Yang | B62K 21/12 |

* cited by examiner

SADDLE-RIDING VEHICLE PROVIDED WITH A FRAME HAVING REDUCED STIFFNESS AGAINST YAW MOVEMENTS

The present invention relates to the manufacturing of a saddle-riding motorcycle, preferably, but not exclusively, a desert-type or more generally an endurance-type motorcycle. In particular, the present invention relates to a saddle-riding vehicle provided with a frame structure whose stiffness against vehicle yaw movements is less that that against torsion and bending movements of the same vehicle.

PRIOR ART

Two-wheeled endurance vehicles comprise a frame structure that includes a steering tube to which there is pivotally connected a steering assembly which controls a steering wheel, or front wheel. The frame structure comprises a central portion to which is hinged a swingarm, by means of a pin, which supports a driving wheel, or rear wheel. Between the central portion and the steering tube, a front part of the frame structure extends, to which there is typically connected an engine that generates driving torque. This is transferred to the rear wheel by means of a mechanical transmission that provides for the use of a chain or a transmission shaft. The frame structure is completed by a rear portion that extends from the central portion towards the rear wheel, and which typically supports the vehicle saddle.

Patent application EP2818391 relates to a vehicle comprising a frame structure as described above. In particular, the front part of the structure comprises two frame sides substantially specular with respect to a vertical plane containing the axis of the steering tube. Each of said frame sides comprises a main component welded at the front to the steering tube and at the rear to a side of the central portion of the frame structure. For each frame side there is also provided a reinforcement component connected at the front to the steering tube and at the rear to the corresponding main element so as to remain below it. For each frame side there is also provided a connecting component that extends from the reinforcement component and comprises a free end to which a part of the engine is connected.

Lastly, the front part of the frame comprises a transversal element extending between the two frame sides in the direction of the width of the vehicle. In particular, this transversal element is located in a position near to that in which each reinforcement component is connected to the corresponding main component of the corresponding frame side.

In the solution described in EP2818391, the engine at the front is connected to the front part of the frame by means of the connecting components described above. Instead, the engine is connected to the central portion mainly by means of the same pin that allows the rotation of the swingarm. In the solution at issue, there is also provided a pair of support brackets, each of which is connected to the inner side of the main component of one of the frame sides of the front part. These support brackets are configured in a V shape, and the top of the bracket is connected to one side of the engine assembly.

In the solution described, as in other conceptually similar solutions, the structure of the frame is configured so as to have the same stiffness against all the movements which the frame and the motor vehicle in general are subject to. In particular, the frame structure is typically designed to offer a high degree of stiffness against torsion, bending and yaw movements. The term "torsion" refers to the oscillations to which the motorcycle is subjected around a longitudinal axis (orthogonal to the axis of rotation of the driving wheel) passing through the centre of gravity. The term "bending" refers to the oscillation around a transversal axis, i.e. orthogonal to the longitudinal axis, while the term "yaw" indicates the oscillation around a vertical axis also passing through the vehicle's centre of gravity.

The patent applicant has noticed an increasing demand from endurance motorcycle riders to diversify, and specifically to reduce, the stiffness of the frame structure against yaw movements, with respect to the stiffness against torsion and bending movements.

SUMMARY

The main aim of the present invention is therefore to provide a saddle-riding vehicle that makes it possible to overcome the afore-mentioned limits, and in particular to meet the needs of riders as indicated above. In the context of this aim, a first object of the present invention is to provide a saddle-riding vehicle whose frame structure gives the vehicle stiffness against yaw movements that is less than the stiffness offered against bending and torsion. Another object of the present invention is to provide a saddle-riding vehicle that is reliable and that can be easily manufactured at competitive costs.

The applicant has noted that the set aim and objects can be achieved through the use of connecting plates that connect, indirectly, the engine assembly to the frame and by using, for these connecting plates, a material that is less stiff than that with which the frame is made. In particular, the set aim and objects are achieved by a saddle-riding vehicle comprising un engine assembly and a frame to which the engine assembly is connected, wherein said frame comprises:

a steering tube to which is pivotally connected a steering assembly that controls a front wheel;

a central portion to which is hinged a first end of a swingarm which also comprises a second end pivotally connected to a rear wheel;

a front part extending between said steering tube and said central portion, wherein this front part comprises a first frame side and a second frame side separated in the direction of the width of the vehicle and wherein said frame sides are made of a first metallic material.

The vehicle according to the invention is characterised in that it comprises at least a pair of connecting plates wherein a first plate connects the engine assembly to the first frame side and a second plate connects the engine assembly to the second frame side. The plates are made of a second metallic material having a modulus of elasticity lower than that of the first material constituting the frame sides of the front part of the frame.

Furthermore, according to the present invention, the front part of the frame comprises first portions extending from the steering tube to corresponding second portions; in particular, the latter extend between the first portions and the central part of the frame. These second portions have a monocomponent configuration, while the first portions have a lattice configuration.

According to the invention, each plate, of said pair of connecting plates, connects a component of the first portion of a corresponding frame side to a portion of a cylinder head and/or of an engine block of the engine assembly.

It has been seen that this solution makes it possible to satisfy the demands of riders, i.e. to increase vehicle maneuverability without reducing the stiffness of the frame against bending and torsion, particularly necessary in motor vehicles for off-road use. In terms of structure and stiffness, the two plates dissociate the frame from the engine assembly, thereby making the vehicle less stiff against yaw movements.

According to a possible embodiment, the front part of said frame comprises at least a transversal element extending in the direction of the width of the vehicle. This transversal element connects the two sides of the frame. The aforementioned first portions extend from the steering tube to said transversal element, while the second portions extend from the transversal element to the central part of the frame.

According to a preferred embodiment, the frame sides are made of steel and the connecting plates are made of aluminium alloy or another light alloy. Preferably, said second material, which the plates are made of, has a modulus of elasticity of an order of magnitude lower than that of the first material constituting the frame.

According to one embodiment, each of the plates is defined by a body comprising two main surfaces and wherein the thickness of said body is identified by the distance between said main surfaces; each plate is connected to the corresponding frame side and to the engine assembly so that the thickness of the plate remains oriented substantially in the direction of the width of the vehicle.

In a preferred embodiment, the frame sides of said front part of the frame have a shape that is substantially specular with respect to a vertical reference plane containing a steering axis of said steering assembly. Preferably, each connecting plate is connected to the corresponding frame side by means of first fixing means and to said engine assembly by means of second fixing means; said connecting plates are arranged in a position substantially specular with respect to a vertical reference plane containing a steering axis of said steering assembly.

According to one embodiment, the engine assembly comprises at least one internal combustion engine that includes an engine block and a cylinder head emerging from said engine block, wherein said engine block is connected, in the proximity of a rear part, to said central portion of the frame by means of a plurality of connecting elements. Each connecting plate connects a corresponding frame side of the front part of the frame to the cylinder head and/or to a front part of the engine block.

In a possible variant of the embodiment described above, the vehicle comprises a pair of second connecting plates, each used to connect the engine assembly to the second part of a corresponding of said frame side.

In a possible embodiment, for each frame side, the corresponding first portion comprises:
 a first component connected, by means of welding, to an upper portion of the steering tube;
 a second component, a front end of which is connected, also by welding, to a lower portion of the steering tube;
 a third component extending from a rear end of the second component to connect with the lower surface of the first component near where the second portion begins;
 a fourth component connecting the first component and the second component to one another.

In one embodiment, for each of said frame sides, one of said first connecting plates connects the third component and/or said second component to said cylinder head and/or to said engine block of said engine assembly.

In a possible configuration, each of said first plates comprises an upper section and a lower section between which a central section extends. This upper section is fixed to the first frame side by means of screw fixing elements, while the lower section is fixed to the engine assembly by means of second fixing elements.

Preferably, the first screw fixing elements comprise a first screw fixing element and a second screw fixing element that fix the corresponding connecting plate in the proximity of the junction region between the third component and the second component of the first portion of the front part of the frame.

Preferably, the second fixing elements comprise a first screw fixing element and a second screw fixing element that fix the corresponding connecting plate to a portion of the cylinder head and to a portion of a front part of the engine block of the engine assembly.

According to a possible embodiment, the vehicle comprises a radiator connected to said connecting plates so as to occupy a position between the steering assembly and the engine assembly.

LIST OF FIGURES

Further characteristics and advantages of the invention will become more apparent from examination of the following detailed description of several preferred, but not exclusive, embodiments of the vehicle, illustrated by way of non-limiting example in the accompanying drawings, wherein.

The same reference numbers and letters in the figures identify the same elements or components.

DETAILED DESCRIPTION

With reference to the aforementioned figures, the present invention therefore relates to a saddle-riding vehicle, an expression intended to mean any moped or motorcycle with two wheels, in other words provided with a front wheel and a rear wheel. In the following description, the vehicle 1 will also be indicated by the expression motor vehicle 1 or motorcycle 1.

The motorcycle 1 comprises an engine assembly 2 and a frame 10 to which the engine assembly 2 is connected. The frame 10 comprises a steering tube 11 to which is pivotally connected a steering assembly 5 that controls a steering wheel 3 (or front wheel 3). The configuration of the steering assembly, known to a skilled person in the field, is not relevant for the present invention and therefore is not described in detail.

The frame 10 comprises a central part 12 to which a first end 8A of a swingarm 8 is hinged. A driving wheel 4 (or rear wheel 4) is pivotally connected to a second end 8B of the swingarm 8. According to a well-known technical solution, and therefore not described in detail, the driving torque generated by the engine assembly 2 is transferred to the driving wheel 4 by means of a mechanical transmission, for example a chain-type transmission.

The frame 10 comprises a front part 15 extending between the steering tube 11 and the central part 12. The front part 15 includes a first frame side 15A and a second frame side 15B that are distanced from one another in the direction of the width of the vehicle. For the purposes of the present invention, the expression "width X", "direction of width X" or "transversal direction" is used to indicate a direction substantially parallel to the axis of rotation T of the rear wheel. On the other hand, the expression "direction of length" or "longitudinal direction Y" is used to indicate a direction substantially orthogonal to the transversal direction (i.e. orthogonal to said axis of rotation T).

The two frame sides 15A,15B of the front part 15 are made of a first metallic material, for example steel, and comprise a plurality of elements connected to one another, typically welded, so as to obtain a single body.

According to the invention, the vehicle 1 comprises at least a pair of connecting plates 16A,16B wherein a first plate 16A connects the engine assembly 2 to the first frame side 15A and a second plate 16B connects the engine assembly 2 to the second frame side 15B.

According to the invention, said plates 16A,16B are made of a second material having a modulus of elasticity lower than that of said first material constituting the two frame sides 15A,15B.

The definition of modulus of elasticity (normally also indicated as Young's Modulus) is well known to an skilled person in the field and expresses the relationship between stress and deformation (Hooke's Law) under uniaxial loading conditions and with elastic behaviour by the material.

For the purposes of the present invention, the expression "plate" is used generically to indicate a body wherein two dimensions (width and length) are prevalent with respect to a third dimension (thickness). The two prevalent dimensions define two main surfaces SP separated by the thickness S (see FIG. 9) of the plate (third dimension).

Unlike prior art, in the vehicle 1 according to the invention the engine assembly 2 is therefore not connected directly to the front part 15 of the frame 10, but indirectly by means of at least a pair of plates 16A,16B made of a material that is less stiff than that used for the frame. The plates 16A,16B therefore do not represent only the connecting interface between the engine assembly 2 and the front part 15 of the frame 10 but, due to the different material, make the engine assembly 2 more independent from the frame 10, at least as far as oscillations generated by yaw movements are concerned.

In particular, for the purposes of the present invention and in order to accentuate the desired effect (reducing stiffness against yaw movements) and to guarantee a high degree of stiffness against bending and torsion, the plates 16A,16B are preferably arranged so that their thickness s (indicated in FIG. 9) is oriented substantially in the direction of the width X of the vehicle 1, i.e. so that their main surfaces SP are oriented substantially in the direction of a longitudinal plane of the vehicle (i.e. parallel to the longitudinal direction Y).

Preferably, each of the plates 16A,16B is connected to the outer part of the corresponding frame side 15A, 15B i.e. so that the two frame sides 15A,15B are located between the plates in the direction of the width X of the vehicle. Alternatively, the plates 16A,16B could also be connected on the inner part, i.e. so as to remain transversely contained between the two frame sides 15A,15B.

According to a possible embodiment, the two frame sides 15A, 15B are made of steel, while the two plates 16A,16B are made of an aluminium alloy, for example by means of a process of casting or forging. As an alternative to aluminium, the two plates 16A,16B could also be made of another light alloy, such as a magnesium alloy.

In general, according to a preferred embodiment, the connecting plates 16A-16B are made of a material having a modulus of elasticity of an order of magnitude lower than that of the material used to manufacture the two sides 15A,15B of the frame 10.

Figure 2:
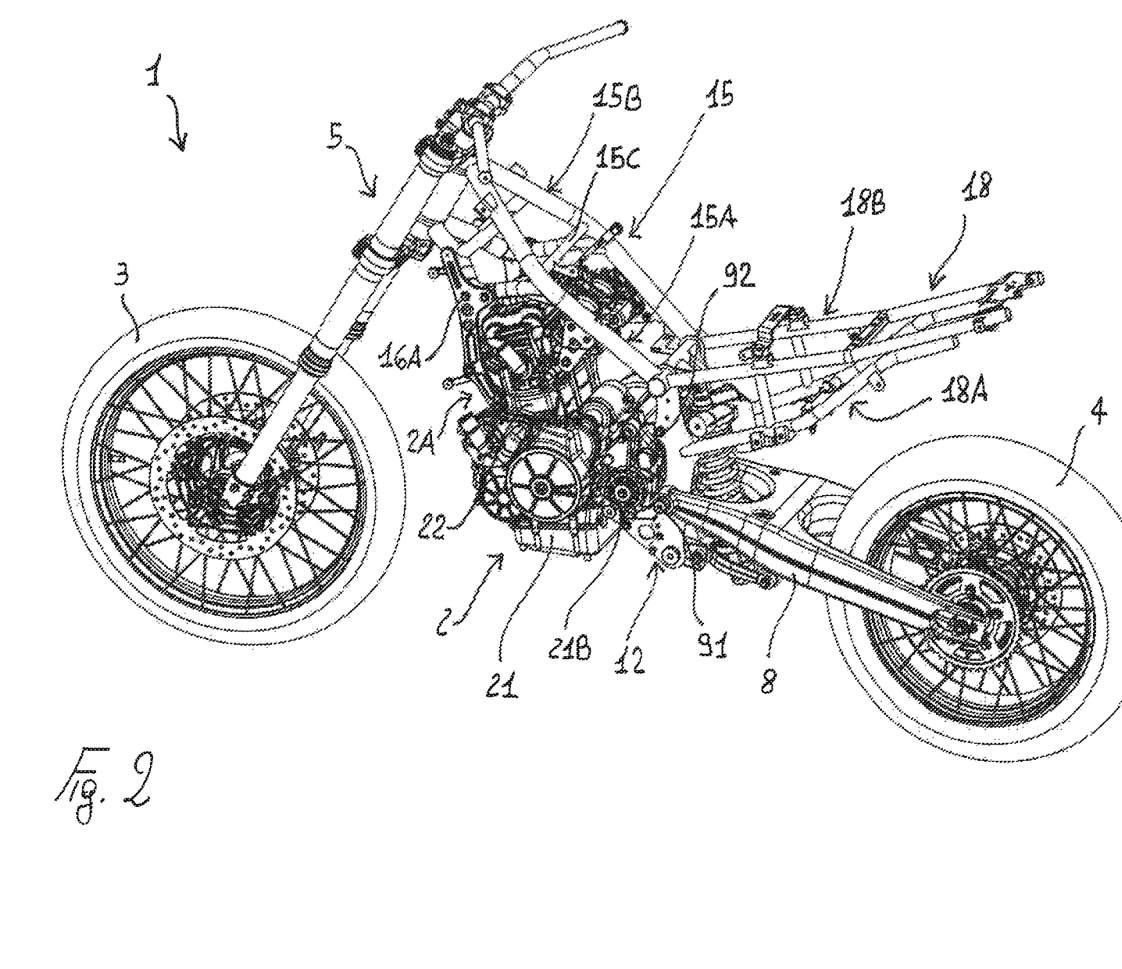
Figure 3:
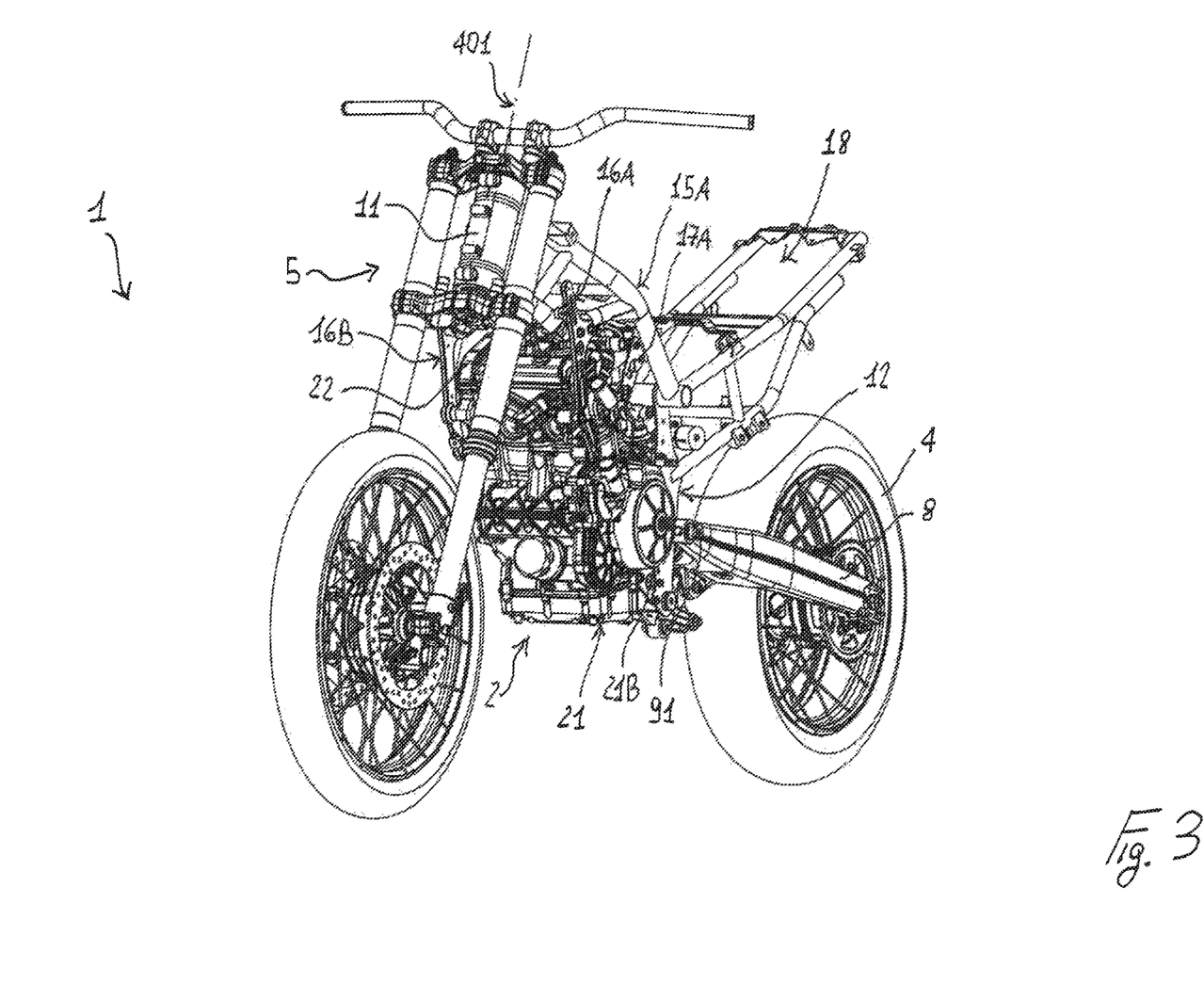

Still with reference to FIGS. 5 to 9, preferably, the two frame sides 15A,15B of the front part 15 have an arrangement that is substantially specular with respect to a vertical reference plane PV containing the steering axis 401 (indicated in FIG. 2). The expression "steering axis" is used to indicate the axis of rotation created by the steering tube 11 for the steering assembly 5. As can be seen in the Figures, in particular from FIG. 10 described below, each of the plates 16A,16B is connected to the corresponding frame side 15A,15B by means of first fixing means and to the engine assembly 2 by means of second fixing means. Preferably, the first and/or second fixing means are of the "screw" type, a term used to indicate not only screw elements in the narrow sense, but any other functionally equivalent fixing element.

The two plates 16A,16B connect to the engine assembly 2 at a point thereon located in the same half-space as the corresponding frame side 15A, 15B, wherein said half-space is identified by vertical plane PV. In substance, when in use, the two plates 16A,16B are each arranged in a half-space identified by the vertical plane PV without crossing said plane. Preferably, also the two plates 16A, 16B are arranged in a position substantially specular with respect to the vertical plane PV. Preferably, also the first fixing means and the second fixing means for the first plate 16A are located in a position substantially specular to the position occupied by the first fixing means and the second fixing means for the second plate 16B where this position is always viewed with respect to the vertical plane PV.

Preferably, the engine assembly 2 comprises at least one combustion engine 2A, which generates the driving torque transferred to the driving wheel 4 by means of the aforementioned transmission. The combustion engine 2A comprises an engine block 21 and a cylinder head 22 emerging above the engine block 21. The term "cylinder head 22" is used to indicate the upper part of the engine which closes the cylinders and incorporates the combustion chambers. For the purposes of the present invention, the term "engine block" is used to indicate the rest of the engine assembly 2, in other words not only the part in which the drive shaft turns, but also the other movement transmission parts between the drive shaft and the transmission to the rear wheel 4. These "transmission parts" therefore include the clutch and gearbox, wherein the clutch, as known, is interposed between the drive shaft and the gearbox to allow gradual movement and to change gears.

According to a preferred embodiment, the rear portion 21B of the engine block 21 of the engine assembly 2 is connected, preferably directly, to the central part 12 of the frame 10 by means of a plurality of connecting elements 91, 92, 93. The plates 16A,16B are used to support the cylinder head 22 of the combustion engine 22A and/or the front portion 21A of the engine block 21.

For the purposes of the present invention, the terms "front" and "rear" used in reference to an end or a part of a structural element of the frame, or to a part of the engine assembly 2 or more generally to a component of a vehicle, indicate the orientation thereof with respect to the longitudinal direction Y and thus whether said part is turned towards the front wheel 3 (front) or towards the rear wheel 4 (rear).

By means of the connecting elements 91,92,93, the engine assembly 2 remains stably connected to the central part 12 of the frame 10, which thus keeps a high degree of stiffness against torsion and bending. Conversely, due to the effect of the connecting plates 16A, 16B, the engine assembly 2 remains more dissociated from the front part 15 of the frame 10 during the oscillations caused by yaw movements. It has been seen that, for the rider, this condition translates as easier maneuverability of the vehicle.

With particular reference to FIGS. 1 to 4, the frame 10 also comprises a rear part 18 extending from the central part 12 towards the rear wheel 4. The function of the rear part 18 is to support the saddle 400 (shown in broken line only in FIG. 4) of the motor-vehicle 1. An embodiment of the rear part 18 is briefly described below by commenting FIG. 5.

Nevertheless, the configuration of the rear part 18 is not relevant for the present invention. According to the invention, the front part 15 of the frame 10 comprises first portions 151A, 151B extending from the steering tube 11 to corresponding second portions 152A, 152B extending between the first portions 151A, 151B and the central part 12 of the frame 10.

Still according to the invention, for each of said frame sides 15A, 15B, the corresponding first portion 151A, 151B has a substantially reticular or lattice type configuration; therefore, for each first portion 151A-151B it is possible to identify a plurality of components 51A-51B, 52A-52B, 53A-53B, 54A-54B that preferably have a tubular shape.

The second portion 152A-152B has a mono-component configuration, i.e. comprising a single component 55A, 55B, which means a single box or tubular component comprising a single component. This second portion 152A-152B extends between the corresponding first portion 151A, 151B and the central part 12 of the frame 10. Therefore, each second portion 152A-152B is defined by a single structural element comprising a front end 155A,155B connected to a structural element of the corresponding first portion 151A, 151B, and a rear end 156A,156B connected to the central part 12 of the frame 10.

With particular reference to FIGS. 5 to 8, according to a possible embodiment, the front part of the frame 10 comprises at least a transversal element 15C extending in the direction X of the vehicle and connecting the two frame sides 15A, 15B. For each of said frame sides the corresponding first portion 151A, 151B extends from the steering tube 11 to the position of the transversal element 15C, while the corresponding second portion 152A-152B extends between the corresponding first portion 151A, 151B and the central part 12 of the frame 10.

Figure 8:
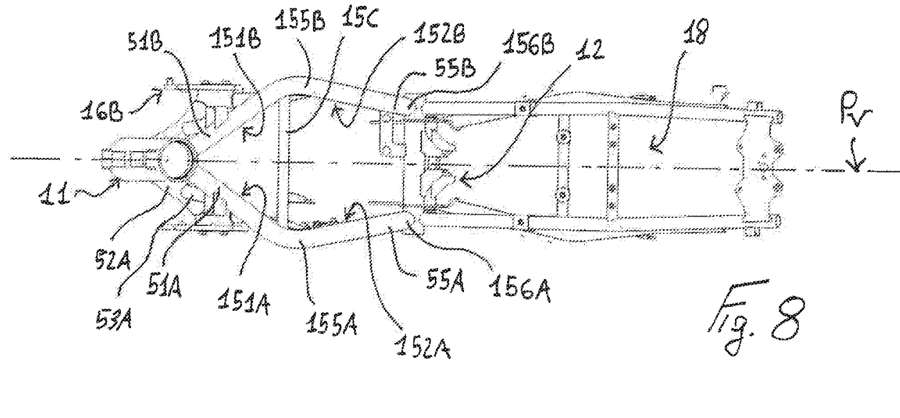

With particular reference to the plan view of FIG. 8, substantially near the longitudinal position of the transversal element 15C, the front part 15 of the frame 10 has its maximum extension in the direction of the width X. The first portion 151A of the first frame side 15A and the first portion 151B of the second frame side 15B converge towards the steering tube 11. Conversely, the second portion 152A of the first frame side 15A and the second portion 152B of the second frame side converge towards the central part 12. It can be noticed, however, that for each frame side 15A,15B, the inclination of the first portion 151A,151B towards the vertical plane PV (containing the steering axis) is greater than the inclination of the corresponding second portion 152A,152B towards the same plane.

According to a preferred embodiment, the connecting plates 16A,16B (hereafter also indicated using the expression "first plates 16A,16B") connect the engine assembly 2 to the first portion 151A-151B of a corresponding frame side 15A, 15B of the front part 15. Preferably, the first plates 16A,16B connect a structural element 51A-51B, 52A-52B, 53A-53B, 54A-54B of the first portion 151A,151B to a portion of the cylinder head 22 and/or to a portion of the engine block 21 of the engine assembly 2.

In a possible embodiment, always visible in the figures, the motor vehicle may also comprise a second pair of connecting plates 17A, 17B (hereafter also indicated using the expression "second plates 17A,17B") each of which connects the engine assembly 2, and preferably the cylinder head 22 thereof, to a second part 152A,152B of a corresponding frame side 15A-15B. Advantageously, also the second plates 17A, 17B can be made of a material having a modulus of elasticity lower than that of the material constituting the front part 15 of the frame 10.

Therefore, according to a preferred embodiment shown in the figures, for each frame side 15A, 15B of the front part 15, one can identify a front plate 16A among said first plates 16A,16B and a rear plate among said second plates 17A, 17B. Overall, this solution provides, for each frame side 15A,15B, two points of connection with a corresponding part of the engine assembly 2 which is in the same half-space (identified by the vertical reference plane PV).

Figure 5:
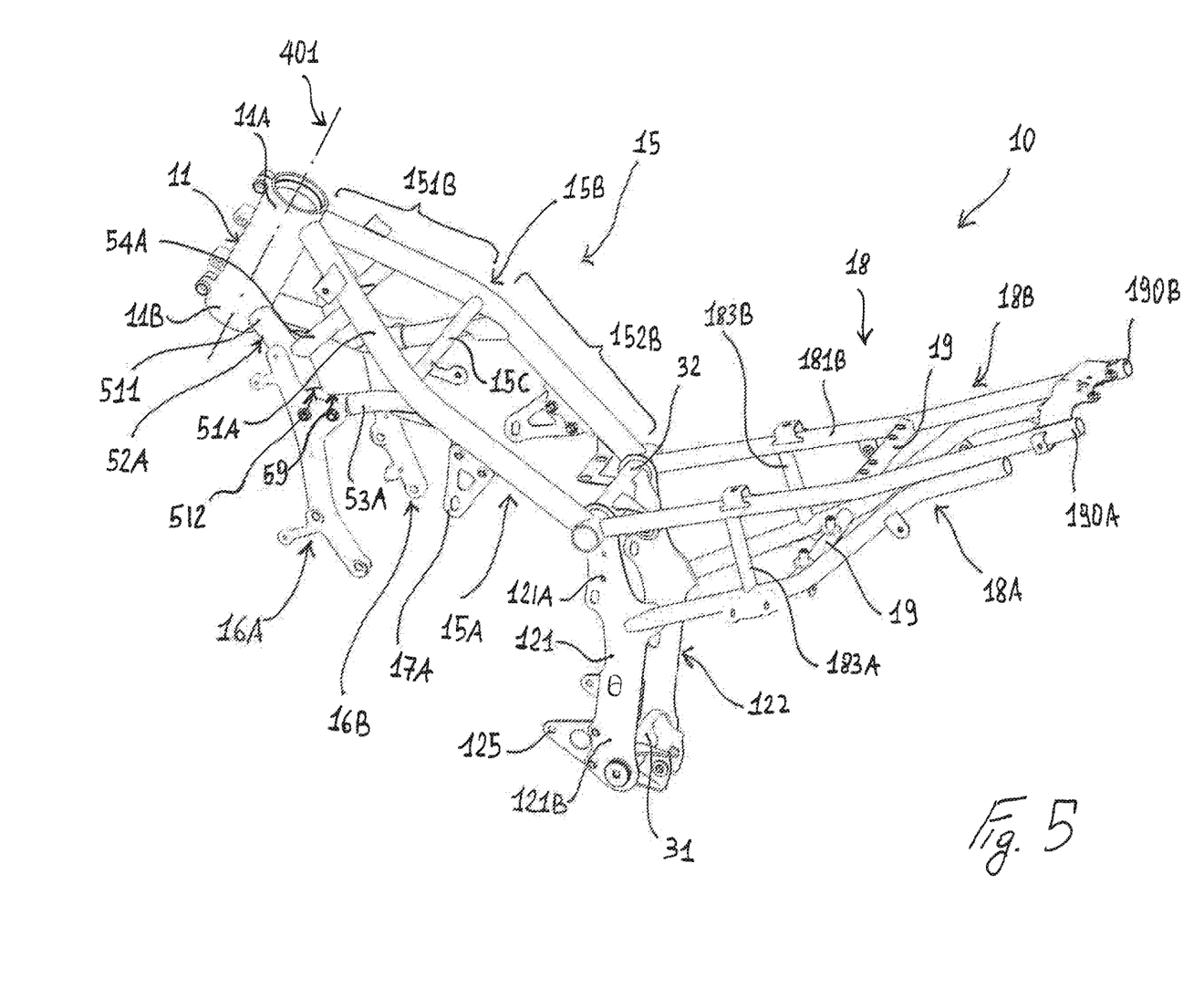
FIG. 5 is a view of a component assembly consisting of a frame and connecting plates of the engine of a vehicle according to the present invention
Figure 7:
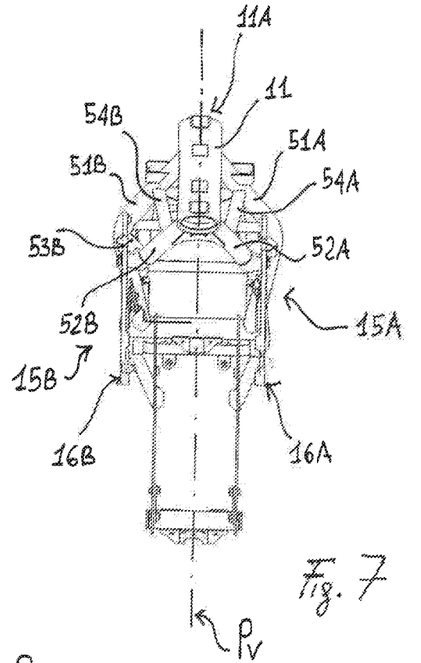

As indicated above, the two frame sides 15A,15B of the front part 15 have an arrangement that is substantially specular with respect to the vertical reference plane PV defined above (FIGS. 7 and 8). With particular reference to FIGS. 5 and 7, there follows a description of a possible, and therefore non-exclusive, embodiment of the first frame side 15A. The following can therefore also be considered valid, mutatis mutandis, for said second frame side 15B.

The first portion 151A of the first frame side 15A comprises a first upper component 51A connected, by welding, to an upper portion 11A of the steering tube 11. Said first component 51A is made in a single tubular piece with component 55A defining the second portion 152A. In particular, the axis of said single tubular piece extends on a first inclined plane P1. The other elements of the first portion 151A are located in a position beneath said first inclined plane P1 (see FIG. 6).

The first portion 151A also comprises a second component 52A a front end 511 of which is connected, again by welding, to a lower portion 11B of the steering tube 11. A third component 53A is connected to the rear end 512 of the second component 51B and extends to connect to the lower surface del first component 51A near the point where the mono-component second portion 151B begins. The first portion 151A also comprises a fourth component 54A that connects the first component 51A and the second component 52A to one another. In particular, this fourth component 54A extends substantially between a central portion of the first component 51A and a central portion of the second component 52A.

According to a possible embodiment, for each of said frame sides 15A,15B, one of the connecting plates 16A,16B is connected to the outer part of the third component 53A and/or to the outer part of the second component 52A, preferably where it joins to the third component 53A. In any case, the scope of the present invention also includes the possibility of connecting the first plates 16A,16B to another component of the corresponding first portion 151A,151B.

According to a possible embodiment (clearly visible in FIG. 5 for example), the third component 53A and the second component 52A are connected by means of a sleeve 59. The latter may consist, for example, of a forged body connected to the end of each of the two components 53A, 52A. The sleeve 59 in substance defines a joint between these components 53A, 52A. Preferably, a corresponding connecting plate 16A is connected to the sleeve 59.

Still with reference to FIGS. 5 to 8, in a preferred embodiment, the central part 12 of the frame 10 comprises a first flank 121 and a second flank 122 opposite one another. These flanks 121,122 are formed by plate-shaped bodies and are connected by a lower pin 31 and an upper pin 32 extending in the direction of the width X of the vehicle. With respect to the aforementioned vertical plane PV, the first flank 121 is located on the same side as the first frame side 15A of the front part 15, while the second flank 122 is located on the same side as the second frame side 15B. The first frame side 15A and the second frame side 15A are connected, preferably welded, to the upper pin 32 of the central portion 12 respectively near a first end 32A and a second end 32B of the same upper pin 32.

According to one embodiment (visible in particular in FIGS. 1, 2 and 4), the rear portion 21B of the engine block 21 of the engine assembly 21 is connected to the central portion 12 by means of a first connecting element 91 coincident with the swing pin of the swingarm 8, i.e. of the rear wheel 4, with respect to the frame 10. Said rear part 21B is also connected to each side 121, 122 of the central portion 21 by means of a second connecting element 92 and a third connecting element 93 arranged respectively above or below the position in which the aforementioned first connecting element 91 is located. Preferably, the second 92 and the third connecting element 93 are defined by studs, pins or other functionally equivalent elements.

Figure 6:
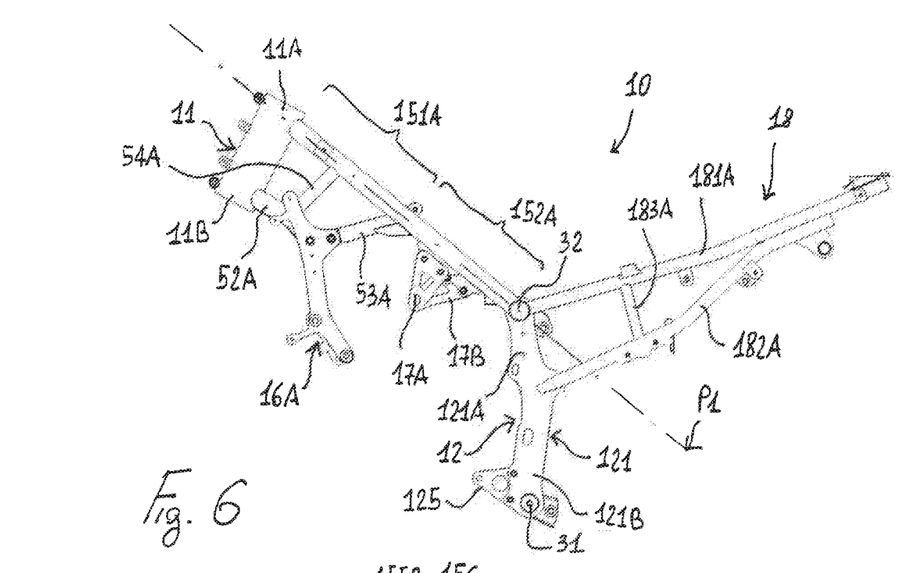
FIGS. 6 to 8 are views, from different observation points, of the component assembly shown in FIG. 5.

With particular reference to FIGS. 5 and 6, the first flank 121 has a first section 121A, from the upper end of which the upper pin 32 extends, and a second section 121B extending below the first portion 121A. From the lower end of the second section 121B the aforementioned lower pin 31 extends. The second section 121B comprises a foot portion 125 extending towards the front wheel 3. This foot portion 125 may be connected to the rest of the second portion 121B, or made in a single piece therewith.

The second connecting element 92 is located in a position vertically contained between the first connecting element 91 and the upper pin 32 and longitudinally more forward, towards the front wheel, with respect to the first connecting element 91. The third connecting element 93 occupies a position vertically below that of the swingarm 8 and longitudinally more forward than that of the first connecting element 91.

Overall, therefore, for each flanks 121, 122 of the central portion 12, there are advantageously provided three connecting points (91, 92, 93) to the portion 21B of the engine block 21. This condition enables the motor vehicle to obtain the required stiffness against torsion and bending. On the other hand, the support of the front portion 21A of the engine assembly 2 (cylinder head 22 and/or engine block 21) is assigned to the first plates 16A,16B and, when present, also to the second plates 17A,17B. According to the principles outlined above, for their structure and mechanical characteristics (material), at least the first plates 16A, 16B, but possibly also the second plates 17A,17B make the frame-engine assembly system less stiff against yaw movements.

As mentioned above, FIGS. 5 to 8 also show a possible, and therefore non-exclusive, embodiment of the rear part 18 of the frame 10, which comprises a first rear frame side 18A and a second rear frame side 18B connected to the first side 121 and to the second side 122 of the central part 12 respectively (see FIG. 5). The two rear frame sides 18A,18B are connected to one another in the direction of the width of the vehicle by means of one or more transversal connecting elements 19. In general, the rear portion 18 can be made from a plurality of tubular components welded together and can be made of the same material in which the other portions 12, 15 of the frame 10 are made.

Each rear frame side 18A, 18B comprises an upper element 181A,181B and a lower element 182A,182B connected to the upper element by means of a connecting element 183A,183B. The upper element 181A,181B is connected, preferably welded, to the upper pin 32 of the central portion 12 of the part opposite that to which the corresponding frame side 15A, 15B of the front part 15 is welded. The lower element 182A,182B, on the other hand, extends from the corresponding side 121, 122 (preferably welded between the regions 121A,121B of the corresponding side) of the central part 12 in a position below the first upper element 181A, 181B before joining it near the protruding end 190A, 190B.

Figures 9, 10, 11A, 11B:
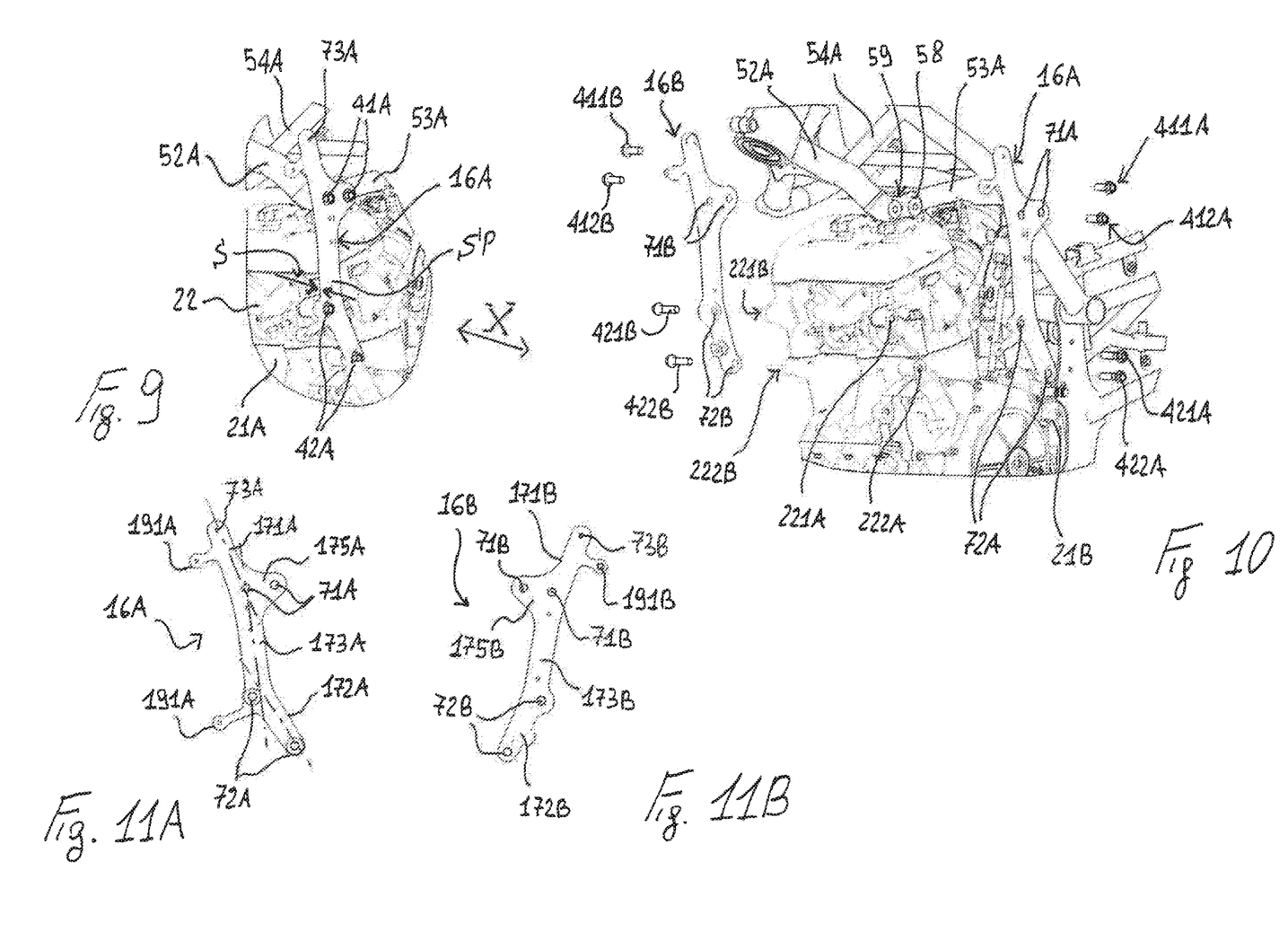
FIG. 9 is an enlarged view of a first portion of the vehicle shown in FIG. 3.
FIG. 10 is an exploded view of a second portion of the vehicle shown in FIG. 3, also comprising said first portion shown in FIG. 9.
FIGS. 11A and 11B show a possible embodiment of a connecting plate for the engine of a vehicle according to the present invention.

FIGS. 9 to 11 show a preferred embodiment of the first plates 16A, 16B and the fixing means thereof. To better describe the installation, hereafter the expression "right plate 16A" is used to indicate the plate connected to the first frame side 15A, located on the right-hand side of the vertical reference plane PV with respect to an observation point at the front of the vehicle (the same observation point used in FIG. 7). Similarly, the expression "left plate 16B" is used to indicate the plate connected to the second frame side 15B, located on the other side of the same vertical plane PV.

The detailed view shown in FIG. 9 shows the right plate 16A in its installation position, in which it is connected, by means of the first fixing means 411A-412A, to at least one component 52A, 53A of the first portion 151A of the first side of the frame 15A and, by means of the second fixing means 421A-422A, to the cylinder head 22 and to the front part 21A of the engine block 21. The perspective view shown in FIG. 9 shows the configuration of the right plate 16A, in particular the thickness S thereof, which is markedly less with respect to the main surfaces SP of the plate. FIG. 9 also shows the orientation of the right plate, so that the thickness S is in the direction of the width X of the vehicle 1.

Figure 1:
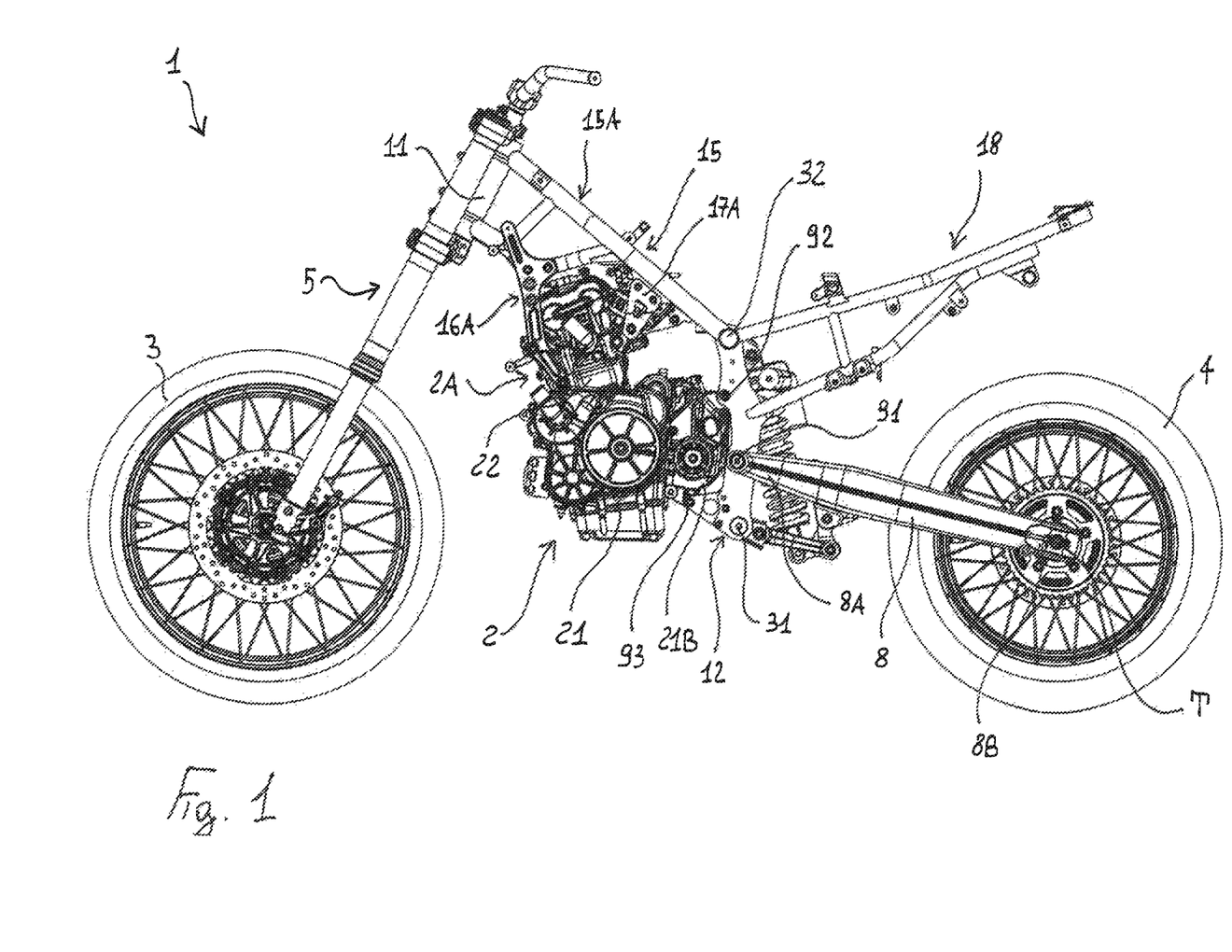
FIGS. 1 to 3 are views, from different observation points, of some components of a saddle-riding vehicle according to the present invention.

FIG. 11A shows only the right plate 16A from an observation point corresponding to that of FIG. 1. FIG. 11B, on the other hand, shows the left plate (hidden in FIG. 1). There follows a description of the right plate 16A, but this description should be considered valid also for the left plate 16B. To that end, parts indicated in FIG. 11A referring to the right plate 16A, are also indicated in FIG. 11B with the suffix B, since they refer to the left plate 16B.

The right plate 16A comprises an upper section 171A and a lower section 172A between which there extends a central section 173A. The upper section 171A is fixed to the first frame side 15A by means of the first fixing means 411A-412A, while the lower section 172A is fixed to the engine assembly 22 by means of the second fixing means 421A-422A.

Preferably, the first fixing means 411A-412A comprise a plurality of screw fixing elements (clearly visible in FIG. 10) that pass through corresponding holes 71A made through the upper section 171A of the right plate 16A. Similarly, the second fixing means 421A-422A also comprise a plurality of screw fixing elements that pass through corresponding holes 72A made through said lower section 172A.

According to a preferred embodiment, the first fixing elements 411A,412A comprise a first screw fixing element 411A and a second screw fixing element 412A that fix the right plate 16A to the first portion 151A of the first frame side near the junction region between the third component 53A and the second component 52A. In the embodiment shown in the figures, this junction region is defined by the aforementioned sleeve 59, which connects the ends of the components 52A, 53A. This sleeve 59 constitutes a sort of connection interface between the first portion 151A of the first frame side 15A and the right plate 16A, thereby defining the seats 58A used for screwing in the relative fixing elements 411A, 412A.

Still according to one embodiment, the second fixing elements 421A-422A comprise a first screw fixing element 421A and a second screw fixing element 422A that fix the right plate 16A to a portion 221A of the cylinder head 22 and to a portion 222A of the front portion 21A of the engine block 21. Alternatively, the two screw fixing elements 421A, 422A could connect the lower section 172A of the right plate 16A only to the cylinder head 22 or only to the front part 21A of the engine block 21.

In the embodiment shown in FIG. 11A, the three sections 171A,172A,173A of the right plate 16 have a substantially splitting-line configuration such that, when in use, the upper section 171A is located in a more forward position with respect to the lower section 172A. In particular, when in use, the upper section extends "forward" (i.e. towards the steering wheel 3) with respect to the central section, while the lower section 172A extends backwards (i.e. towards the driving wheel 4). Between the upper section 171A and the central section 173A there extends an elbow part 175A defining a seat for a screw fixing element 411A that connects the right plate 16A to the third component 53A of the first frame side 15A. As can be seen in FIG. 1, also due to the effect of the elbow portion 175, following its fixing, the plate 16A is configured like a sort of extension towards the bottom of the second component 52A.

As indicated above, the left plate 16B has a conformation substantially the same as that of the right plate 16A, while the mode of fixing the plate to the front part 15 of the frame 10 and/or to the engine assembly 2 also remains the same, as can be seen in FIG. 10. Therefore, also in this figure the numerical references used for the form and method of installation of the left plate 16B are indicated with the suffix B instead of A.

Figure 4:
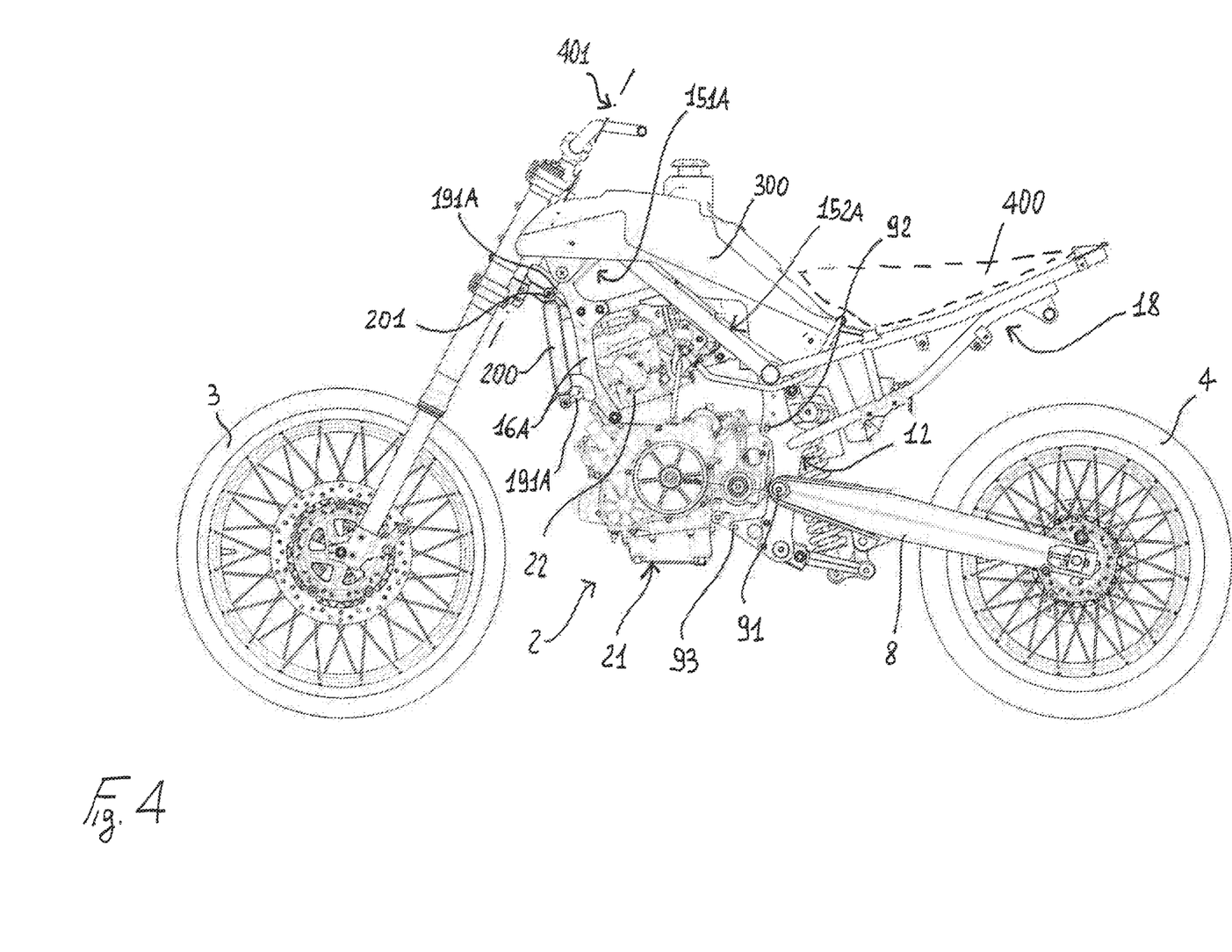
FIG. 4 is another view of the vehicle illustrated in FIGS. 3 and 4, wherein further components of the vehicle are visible.

According to a preferred embodiment, visible in FIG. 4, the first plates 16A,16B are connected to the corresponding frame side 15A,15B so that the cylinder head 22 of the engine assembly 2 remains substantially comprised, in a longitudinal direction, between the position of the plates and the central part 12 of the frame 10. In this way, in the space between the steering assembly 5 and the first plates 16A,16B there is located a radiator 200 which, as is known to a skilled person in the field, is used to cool the engine assembly 2.

According to the embodiment shown in FIG. 4, the radiator 200 is connected to the first connecting plates 16A,16B, and is supported by the plates. As can be seen in FIGS. 11A,11B, the first plates 16A,16B comprise connecting ends 191A,191B that, when in use, extend towards the front wheel 3. Suitable fixing means 201 enable the stable connection of the radiator 200 to the first plates 16A,16B.

Still with reference to FIG. 4, the first plates 16A,16B can advantageously also provide a fastening point for the fuel tank 300 of the vehicle 1. Again, with reference to FIGS. 11A, 11B, preferably, the first plates 16A,16B comprise a perforated end 73A,73B to which the fuel tank 300 is fixed by means of further screw fixing means 202. Preferably, for each plate 16A,16B this perforated end 73A,73B coincides with the end of the upper section 171A,171B of the same plate.

In general, therefore, in a possible embodiment, the plates 16A,16B are multi-functional, being able to be used not only to support the engine assembly 2, but also to connect other components of the vehicle (for example the radiator 200 and the fuel tank 300) that are functional to the engine assembly 2.

The technical solutions described above enable the pre-set aims and objects to be fully achieved. In particular, the use of connecting plates to connect the sides of the frame to the front portion of the engine assembly make it possible to have a vehicle whose frame still offers strong resistance to torsion and bending, but lower resistance to yaw movements, thereby favouring vehicle maneuverability by the rider.

The invention claimed is:

1. A saddle-riding vehicle comprising:
an engine assembly and a frame to which is connected said engine assembly, wherein said frame comprises:
  a steering tube to which a steering assembly that controls a front wheel is pivotally connected;
  a central part to which is hinged a first end of a fork which also comprises a second end pivotally connected to a rear wheel; and
  a front part extending between said steering tube and said central portion, wherein said front part comprises a first frame side and a second frame side separated in the direction of a width of the vehicle, wherein said frame sides are made of a first metallic material having a first modulus of elasticity; and
a first plate connecting said engine assembly to said first frame side and a second plate connecting said engine assembly to said second frame side, said plates being made of a second metallic material having a second modulus of elasticity lower than said first modulus of elasticity of said first metallic material,
wherein said front part of said frame comprises first portions extending from said steering tube to corresponding second portions,
wherein said second portions extend between said corresponding first portions and said central part of said frame,
wherein said second portions have a mono-component configuration and wherein said first portions have a lattice configuration,
wherein each of said first and second plates connects a component of said first portion of a corresponding frame side to a portion of a cylinder head and/or of an engine block of said engine assembly.

2. The vehicle of claim 1, wherein said front part of said frame comprises at least a transversal element extending in the direction of the width of the vehicle and connecting said first and second frame sides, said first portions extending from said steering tube to said transversal element and said second portions extending from said transversal element to said central part of said frame.

3. The vehicle of claim 1, wherein said frame sides are made of steel and said plates are made of an aluminium alloy.

4. The vehicle of claim 1, wherein said second material has a modulus of elasticity of an order of magnitude lower than that of said first material.

5. The vehicle of claim 1, wherein each of said first and second plates is defined by a body comprising first and second main surfaces and wherein a thickness of said body is substantially the distance between said main surfaces, each of said first and second plates being connected to the corresponding frame side and to the engine assembly so that a thickness of the respective plate remains substantially oriented in the direction of the width of the vehicle.

6. The vehicle of claim 1, wherein said frame sides of said front part have an arrangement that is substantially specular with respect to a vertical reference plane containing a steering axis for said steering assembly.

7. The vehicle of claim 1, wherein each of said first and second plates is connected to the corresponding frame side via first fixing means and to said engine assembly via second fixing means, wherein said first and second plates are arranged in a position substantially specular with respect to a vertical reference plane containing a steering axis for said steering assembly.

8. The vehicle of claim 1, wherein:
said engine assembly comprises at least one internal combustion engine that includes an engine block and a cylinder head emerging from said engine block,
wherein said engine block is connected, in the proximity of a rear portion, to said central part of said frame via a plurality of connecting elements, and
wherein each plate of said first and second plates connects a corresponding frame side of said front part to said cylinder head and/or to a front portion of said engine block.

9. The vehicle of claim 1, comprising a further pair of connecting plates, each used to connect said engine assembly to said second portion of a corresponding frame side.

10. The vehicle of claim 1, wherein said first portion comprises:
a first component welded to an upper portion of said steering tube;
a second component, a front end of which is welded to a lower portion of said steering tube;
a third component extending from a rear end of said second component to connect with the lower surface of said first component near where said second portion begins; and
a fourth component connecting said first component and said second component to one another.

11. The vehicle of claim 10, wherein, per each of said frame sides, one of said first and second plates connects said third component and/or said second component to a cylinder head of said engine assembly and/or to an engine block of said engine assembly.

12. The vehicle of claim 1, wherein each of said first and second plates comprises an upper section, a lower section, and a central section extending there between, said upper section is fixed to the first frame side via first screw fixing elements, and said lower section is fixed to said engine assembly via second screw fixing elements.

13. The vehicle of claim 12, wherein said first screw fixing elements comprise a first screw fixing element and a second screw fixing element that fix the corresponding plate to a junction region between said third component and said second component.

14. The vehicle of claim 12, wherein said second fixing elements comprise a first screw fixing element and a second screw fixing element that fix the corresponding plate to a portion of a cylinder head of said engine assembly and to a portion of a front portion of an engine block of said engine assembly.

15. The vehicle of claim 1, comprising a radiator connected to said first and second plates to occupy a position between said steering assembly and said engine assembly.

* * * * *